(12) United States Patent
Rossiter

(10) Patent No.: US 11,660,564 B2
(45) Date of Patent: *May 30, 2023

(54) ACTIVATED CARBON AND CATALYST FILTER

(71) Applicant: Donaldson Company, Inc., Minneapolis, MN (US)

(72) Inventor: William S. Rossiter, Brooklyn Park, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,736

(22) Filed: Aug. 13, 2021

(65) Prior Publication Data

US 2021/0370220 A1 Dec. 2, 2021

Related U.S. Application Data

(63) Continuation of application No. 15/557,673, filed as application No. PCT/US2016/022137 on Mar. 11, 2016, now Pat. No. 11,090,602.

(Continued)

(51) Int. Cl.
*B01D 53/72* (2006.01)
*B01J 23/34* (2006.01)
(Continued)

(52) U.S. Cl.
CPC ........ *B01D 53/0415* (2013.01); *B01D 53/72* (2013.01); *B01D 53/75* (2013.01); *B01D 53/82* (2013.01); *B01D 53/864* (2013.01); *B01D 53/8687* (2013.01); *B01J 23/34* (2013.01); *B01J 23/70* (2013.01); *B01J 37/0215* (2013.01); *B01D 2253/102* (2013.01);
(Continued)

(58) Field of Classification Search
None
See application file for complete search history.

(56) References Cited

U.S. PATENT DOCUMENTS 4,200,609 A   4/1980   Byrd et al.
4,259,092 A   3/1981   Matsuo et al.
(Continued)

FOREIGN PATENT DOCUMENTS

CN   201168570   12/2008
CN   101511675   8/2009
(Continued)

OTHER PUBLICATIONS

Communication Pursuant to Rules 161(2) and 162 EPC for European Patent Application No. 16765512.5 dated Oct. 25, 2017 (2 pages).

(Continued)

*Primary Examiner* — Philip Y Louie
(74) *Attorney, Agent, or Firm* — Pauly, DeVries Smith & Deffner LLC

(57) ABSTRACT

Embodiments of the invention include a filtration element. In an embodiment, the invention includes a filtration element for an airplane cabin that includes a first media portion upstream from a second media portion. The first media portion can include activated carbon. The second media portion can include a catalyst material. Other embodiments are also included herein.

20 Claims, 7 Drawing Sheets

Related U.S. Application Data

(60) Provisional application No. 62/133,110, filed on Mar. 13, 2015.

(51) Int. Cl.

| | | |
|---|---|---|
| *B01J 23/72* | (2006.01) | |
| *B01D 53/04* | (2006.01) | |
| *B01D 53/75* | (2006.01) | |
| *B01J 23/70* | (2006.01) | |
| *B01D 53/82* | (2006.01) | |
| *B01D 53/86* | (2006.01) | |
| *B01J 37/02* | (2006.01) | |

(52) U.S. Cl.
CPC ........... *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2257/708* (2013.01); *B01D 2258/06* (2013.01); *B01D 2259/4508* (2013.01); *B01D 2259/4575* (2013.01)

(56) References Cited

U.S. PATENT DOCUMENTS

| | | | |
|---|---|---|---|
| 5,488,023 | A | 1/1996 | Gadkaree et al. |
| 5,750,026 | A | 5/1998 | Gadkaree et al. |
| 6,553,989 | B1 | 4/2003 | Richardson et al. |
| 6,773,477 | B2 | 8/2004 | Lindsay et al. |
| 7,300,500 | B2 | 11/2007 | Okada et al. |
| 7,313,342 | B2 | 12/2007 | Katayama et al. |
| 7,473,402 | B2 | 1/2009 | Michalakos et al. |
| 8,074,927 | B2 | 12/2011 | Markwart et al. |
| 8,568,680 | B2 | 10/2013 | Hui et al. |
| 9,211,954 | B2 | 12/2015 | Barkowsky |
| 9,333,488 | B2 | 5/2016 | Hingorani et al. |
| 11,090,602 | B2 | 8/2021 | Rossiter et al. |
| 2004/0163540 | A1* | 8/2004 | Mori .................... B01D 46/10 55/486 |
| 2004/0255785 | A1 | 12/2004 | Koslow |
| 2005/0053515 | A1 | 3/2005 | Yates et al. |
| 2005/0229562 | A1 | 10/2005 | Dallas et al. |
| 2007/0163588 | A1 | 7/2007 | Hebrank et al. |
| 2008/0264259 | A1 | 10/2008 | Leung et al. |
| 2009/0227195 | A1 | 9/2009 | Buelow et al. |
| 2009/0232718 | A1 | 9/2009 | Hagh et al. |
| 2009/0274936 | A1 | 11/2009 | Goldstein et al. |
| 2010/0018396 | A1 | 1/2010 | Ding et al. |
| 2010/0158775 | A1 | 6/2010 | Galligan et al. |
| 2010/0310441 | A1 | 12/2010 | Lapadula et al. |
| 2011/0308524 | A1 | 12/2011 | Brey et al. |
| 2012/0180664 | A1 | 7/2012 | Lundquist et al. |
| 2012/0272829 | A1 | 11/2012 | Fox et al. |
| 2013/0156670 | A1 | 6/2013 | Galligan et al. |
| 2014/0010714 | A1 | 1/2014 | Sugimoto et al. |
| 2014/0255283 | A1 | 9/2014 | Sidheswaran et al. |
| 2016/0166970 | A1 | 6/2016 | Boehringer et al. |
| 2018/0050297 | A1 | 2/2018 | Rossiter |

FOREIGN PATENT DOCUMENTS

| | | |
|---|---|---|
| DE | 102010005114 | 7/2011 |
| EP | 1543876 | 6/2005 |
| WO | 2006110353 | 10/2006 |
| WO | 2012167280 | 12/2012 |
| WO | 2016149129 | 9/2016 |

OTHER PUBLICATIONS

"Extended European Search Report," for European Patent Application No. 16765512.5 dated Oct. 24, 2018 (9 pages).

File History for U.S. Appl. No. 15/557,673 downloaded Sep. 1, 2021 (455 pages).

"First Office Action," for Chinese Patent Application No. 201680014832.6 dated Apr. 24, 2020 (15 pages) with English Translation.

"International Preliminary Reporton Patentability," for PCT Application No. PCT/US2016/022137 dated Sep. 28, 2017 (6 pages).

"International Search Report and Written Opinion," for PCT Application No. PCT/US2016/022137 dated Jun. 3, 2016 (8 pages).

Kumar, "Filtration Textiles," Textiles for Industrial Applications, Taylor & Francis, 2014, pp. 135-166 (32 pages).

"Response to Extended European Search Report," for European Patent Application No. 16765512.5 filed May 20, 2019 (11 pages).

"Second Office Action," for Chinese Patent Application No. 201680014832.6 dated Oct. 19, 2020 (14 pages) with English Translation.

* cited by examiner

ACTIVATED CARBON AND CATALYST FILTER

This application is a continuation of U.S. application Ser. No. 15/557,673, filed Sep. 12, 2017, which is a national stage application under 35 U.S.C. 371 of PCT International Patent Application No. PCT/US2016/022137, filed Mar. 11, 2016, and claims the benefit of U.S. Provisional Application Ser. No. 62/133,110, filed Mar. 13, 2015, the content of which are incorporated herein by reference in their entireties.

FIELD OF THE TECHNOLOGY

The present application relates to a filtration element and methods of filtering. More specifically, the present application relates to filtration element for use in enclosed environments, including aircraft cabins.

BACKGROUND OF THE INVENTION

While an airplane is in flight the air within the cabin is typically recirculated and replenished. The air within the cabin can be contaminated with volatile organic compounds (VOCs), including low molecular weight hydrocarbons and high molecular weight hydrocarbons. The VOCs can be introduced to the cabin air from numerous sources, such as food preparation, people and clothing within the cabin, cleaning supplies, and aircraft engines and equipment. Even relatively low concentrations of contaminants, such as hydrocarbons at the sub-parts-per-million (sub-ppm) level are undesirable.

Efforts have been made to reduce the amount of contaminants in cabin air, and in particular recirculated cabin air, in order to lessen the exposure of passengers and crew to contaminants. However, the enclosed nature of aircraft cabins, the high density of passengers, and the cumulative exposure of aircraft crews makes maintaining a clean atmosphere within aircraft cabins particularly important. Some aircraft cabin filters, such as those in U.S. Patent Publication No. 20120180664, are primarily directed to removal of particulate contaminants. Other aircraft cabin filters do remove or break down hydrocarbons, but are either ineffective or rely upon the need to add energy, such as elevation in temperature, to successful break down contaminants. These efforts have not been entirely successful because they fail to effectively and efficiently remove or break down contaminants, especially VOCs, and in particular VOCs at the low concentrations and varied molecular weights found in aircraft cabins.

Accordingly, there is a need for improved methods and systems for removal of contaminants from air that will be supplied to the cabin of an airplane.

SUMMARY OF THE INVENTION

The air within aircraft cabins is often contaminated with low levels of VOCs. The VOCs can originate from cleaning supplies, from aircraft systems (such as engine exhaust and compressor leaks), as well as from the clothing and possessions of passengers and staff. Even food, such as alcoholic drinks, can contribute to the presence of VOCs within an aircraft cabin. The filter elements described herein allow for removal of VOCs from air and other gases, such as from air circulated and/or recirculated through aircraft cabins. In particular, the filter elements allow for effective removal of VOCs at very low concentrations, as well as at low residence times and high flow rates without changing the temperature of the filtered air stream.

The concentrations of these VOCs within aircraft cabins can be somewhat variable, depending upon conditions such as whether the aircraft is on the ground or airborne, whether the engines and accessory equipment (such as compressors and hydraulic systems) are operating, whether the aircraft interior is being cleaned or has recently been cleaned, the number of passengers on board, and the cargo and luggage within the aircraft. Typically the levels of VOCs in the aircraft cabin are at sub part-per-million level, and thus measure in the part-per-billion level. These levels are still sufficient to lead to undesirable effects, and therefore reducing them to lower levels is desirable.

The filter elements and media disclosed herein remove and/or break down sufficient levels of VOCs even at low concentrations typically experienced within aircraft cabins. As used herein the terms "remove" and "break down" signify eliminating a contaminant from a fluid stream or reducing the amount of contaminant in a fluid stream, and can be used interchangeably. In addition, the filter elements and media disclosed herein also effectively remove VOCs over a range of molecular weights, such as lower molecular weight VOCs (characterized herein as molecular weights of less than or equal to 60 g/mol) as well as higher molecular weight VOCs (characterized herein as molecular weights of greater than 60 g/mol). The filter elements and media reduce these VOC levels even at the high flow rates typically present in aircraft cabin filter systems, and do so at or near room temperature without the addition of further energy and in a low-weight package.

Thus, the filter elements disclosed herein remove VOCs using a filter element that allows for removal of both high molecular weight and low molecular weight hydrocarbons from an enclosed space, such as an aircraft cabin. The filter element and media is configured so as to remove and/or break down these hydrocarbons even at the very low concentrations often observed in airplane cabins, where existing elements and media are inadequate. In addition, the filter elements and media allow for hydrocarbon removal from relatively high velocity airstreams present in cabin recirculation systems. This allows for successful hydrocarbon removal even with low residence time within the air filtration element. Further, the filter element allows removal of contaminants without the input of additional energy, such as from UV light or heat. Finally, the filter element can be constructed and arranged to be relatively lightweight, thereby satisfying the need to keep total weight down, which is important for aviation uses.

In certain embodiments the filter elements include activated carbon positioned upstream of a catalyst material, in particular a low-temperature catalyst that breaks down VOCs at or near room temperature. The filter elements provide various benefits to the removal of VOCs from gas streams. These benefits can include, in various implementations, more complete removal of both large and small molecular weight compounds, removal of large molecular weight compounds without significant release of further harmful breakdown products, the ability to remove hydrocarbons successfully at very low molecular weights, removal of hydrocarbons even at very high gas flow rates, and avoidance of overloading (also known as poisoning) of the catalyst.

In an embodiment, the filter element includes a first media portion configured to adsorb high molecular weight molecules. The second media portion is configured to break down low molecular weight molecules, such as breaking down low molecular weight molecules into water and carbon dioxide. The first media portion can comprise activated carbon; and the second media portion downstream of the first media portion can comprise a catalyst material. The upstream activated carbon typically removes high molecular weight hydrocarbons, while the downstream catalyst material typically removes low molecular weight hydrocarbons. This structure allows the upstream activated carbon to remove larger VOCs that would otherwise potentially poison the catalyst material. In addition, the downstream catalyst material breaks down the smaller VOCs that are not effectively captured by the activated carbon. Further, by removing the larger upstream VOCs before they reach the catalyst, the production of undesirable byproducts of catalytic degradation of large VOCs is prevented. For example, some larger VOCs break down into smaller VOCs such as formaldehyde. By primarily removing the larger VOCs at the upstream filter media, fewer large VOCs reach the downstream portion of the filter media. The lower concentrations of high molecular weight VOCs reaching the catalyst media reduces the potential for the production of undesirable byproducts. Also, to the extent such byproducts are produced, the lower VOC load on the downstream media allows them to be further catalyzed by the catalytic media.

In an example embodiment the first media portion is configured to degrade hydrocarbons having a molecular weight of at least 60 g/mol, and the second media portion is configured to degrade hydrocarbons having a molecular weight of less than 60 g/mol. In some embodiments the first media portion is configured to degrade hydrocarbons having a molecular weight of at least 60 g/mol, and the second media portion is configured to degrade hydrocarbons having a molecular weight of less than 40 g/mol. In certain embodiments the first media portion is configured to remove hydrocarbons having a molecular weight of at least 80 g/mol.

In an embodiment the first media portion is configured to maintain at least 50 percent efficiency for removal from an air stream of hydrocarbons having a molecular weight of at least 60 g/mol at concentration levels of less than 1.0 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 3000 hours. In some implementations, in combination, the first media portion and second media portion are configured to maintain at least 50 percent efficiency for removal of all hydrocarbons at concentration levels of less than 1.0 parts per million for at least 3000 hours. In certain embodiments the hydrocarbon removal can occur at a face velocity through the filter element of 12 feet per minute or greater. In certain implementations the hydrocarbon removal occurs without apparent change of temperature of the air stream.

In an embodiment the first media portion is configured to maintain at least 50 percent efficiency for removal from an air stream of hydrocarbons having a molecular weight of at least 60 g/mol at concentration levels of less than 0.5 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 3000 hours. In some implementations, in combination, the first media portion and second media portion are configured to maintain at least 50 percent efficiency for removal of all hydrocarbons at concentration levels of less than 0.5 parts per million for at least 3000 hours. In certain embodiments the hydrocarbon removal can occur at a face velocity through the filter element of 12 feet per minute or greater. In certain implementations the hydrocarbon removal occurs without apparent change of temperature of the air stream.

In some implementations the first media portion is configured to remove at least 50 percent of hydrocarbons having a molecular weight of at least 60 g/mol, and the second media portion is configured to break down at least 50 percent hydrocarbons having a molecular weight of less than 60 g/mol at concentrations of less than 1.0 parts per million. This hydrocarbon removal can occur at face velocity through the filter element of 12 feet per minute.

In an embodiment the first media portion is configured to remove at least 50 percent of hydrocarbons having a molecular weight of at least 60 g/mol, and the second media portion is configured to break down at least 40 percent of hydrocarbons having a molecular weight of less than 60 g/mol, at concentrations of less than 1.0 parts per million, and at a temperature from 60 to 120° F.

In some embodiments the first media portion is configured to remove at least 50 percent of hydrocarbons having a molecular weight of at least 60 g/mol, and the second media portion is configured to remove at least 40 percent of hydrocarbons having a molecular weight of less than 60 g/mol, at concentrations of less than 1.0 parts per million with an average air residency time in the filter element of less than 0.1 seconds. In some embodiments the average air residency time in the filter element is about 0.05 seconds.

A method for filtering an airstream for the cabin of an airplane is also disclosed, the method including directing an unfiltered airstream through a filtration element and directing a filtered airstream from the filtration element into a cabin of an airplane. The filtration element comprises a first media portion upstream from a second media portion; wherein the first media portion comprises activated carbon and the second media portion comprises a catalyst.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

Figure 1:
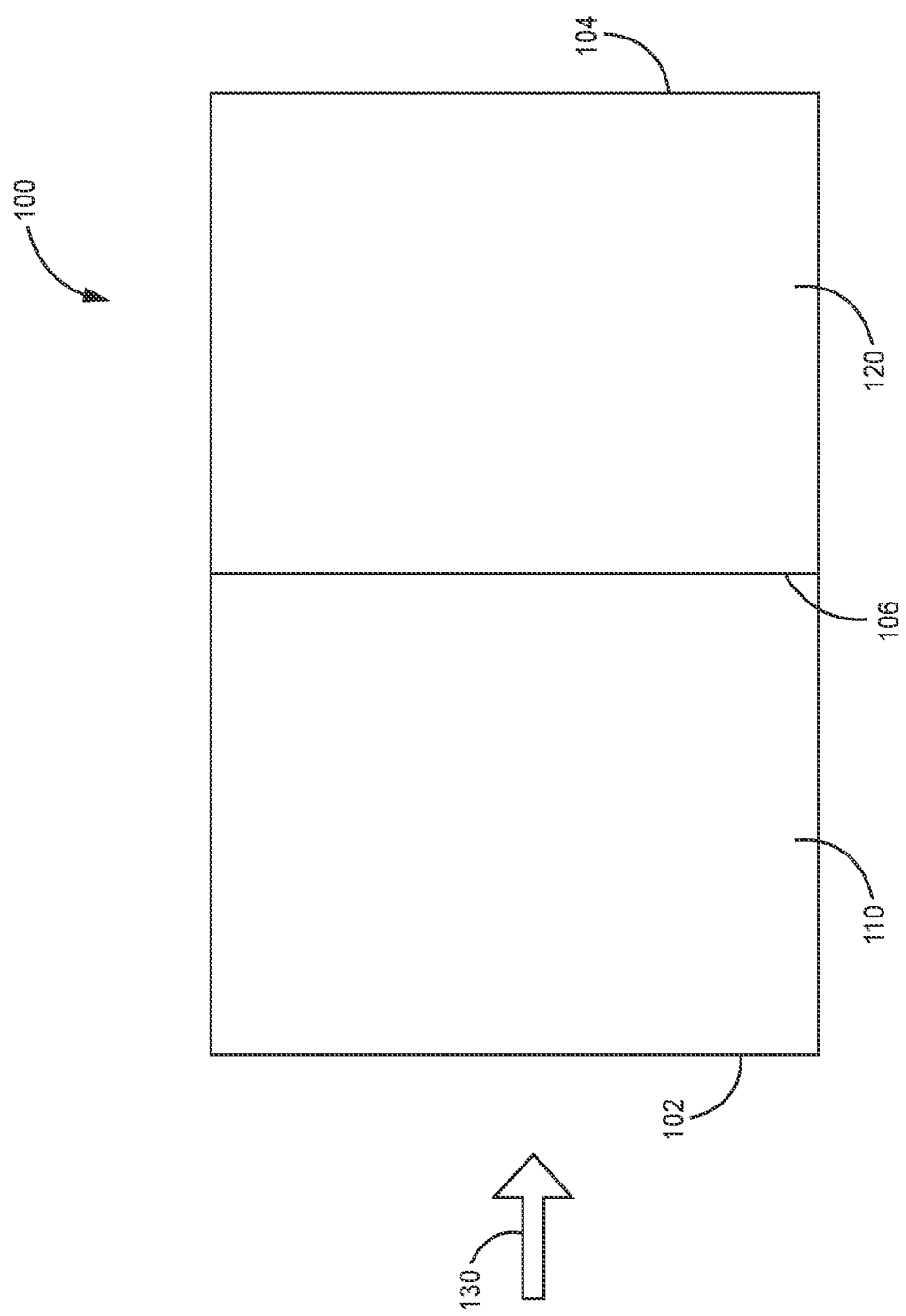
FIG. 1 is a simplified view of a filtration element, according to an embodiment.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

A filtration element as described herein can include a first media portion and a second media portion. The first media portion can include activated carbon and the second media portion can include a catalyst material. The filtration element can be used within an aircraft, such as to filter an airstream that will be directed into the cabin of the aircraft. The filtration element can be configured to remove low molecular weight molecules, as well as high molecular weight molecules.

The filter elements described herein allow for removal of VOCs. The air within aircraft cabins is often contaminated with low levels of VOCs. These VOCs can originate (for example) from cleaning supplies, from aircraft systems (such as engine exhaust and compressor leaks), as well as from the clothing and possessions of passengers and staff. Even food, such as alcoholic drinks, can contribute to the presence of VOCs within an aircraft cabin.

In order to assess efficacy of removal of VOCs from aircraft cabins the tests that are normally performed are short duration experiments at elevated volatile organic compound concentrations. For example, in order to replicate exposure to sub-part-per-million levels of VOCs over 3,000 or more hours of a filter life, existing tests use higher concentrations of VOCs for shorter durations. An example of such a test uses approximately 15 parts-per-million of toluene for 3 hours to model removal of 15 parts per billion for 3000 hours. Such accelerated testing at higher concentrations fails to accurately reflect the performance of filter elements. Many adsorbent materials, including various activated carbon compounds, actually become less effective at low concentrations of VOCs. Thus, an adsorbent media that performs well at a given part-per-million concentration of VOCs will often remove a much lower percentage of VOCs at lower concentrations.

A further challenge to removal of VOCs from aircraft cabins and other enclosed spaces is that existing filtration constructions often fail to remove lower molecular weight compounds, such as those with a molecular weight below 60 g/mol. Ethanol, for example, with a molecular weight of just over 46 g/mol, is not typically effectively removed by activated carbon. Therefore, existing filtration constructions that rely exclusively on activated carbon generally fail to effectively remove ethanol from filtered air.

The concentrations of VOCs within aircraft cabins can be somewhat variable, depending upon conditions that include whether the aircraft is on the ground or airborne, whether the engines and accessory equipment (such as compressors and hydraulic systems) are operating, whether the aircraft interior is being cleaned or has recently been cleaned, the number of passengers on board, and the cargo and luggage within the aircraft. The contaminants can include, for example, limonene, toluene, acetone, ethanol, etc. The contaminants can be those with higher molecular weights, such as limonene (136 g/mol) from, for example, cleaning products, or toluene (92 g/mol) from, for example, exhaust, as well as lower molecular weight materials such as acetone (58 g/mol) from, for example, biological processes, ethanol (46 g/mol) from hand wipes, or formaldehyde (30 g/mol) as an off gassed material from manufactured products such as leather, fabric, etc. Typically the levels of VOCs in the aircraft cabin are at sub part-per-million level, and thus measure in the part-per-billion level. These levels are still undesirable, and therefore reducing them to lower levels is desirable.

In order to assess efficacy of removal of VOCs from aircraft cabins, the tests that are normally performed are short in duration and at elevated VOC concentrations. For example, in order to replicate exposure to sub-part-per-million levels of VOCs over 3,000 or more hours, existing tests use higher concentrations of VOCs for shorter durations. An example of such a test is uses approximately 15 parts-per-million of toluene for 3 hours to seek to model removal of 15 parts per billion for 3000 hours. Unfortunately, as recognized and described herein, such accelerated testing at higher concentrations fails to accurately reflect the performance of filter elements. Many adsorbent materials, including various activated carbon compounds, actually become less effective at low concentrations of VOCs. Thus, an adsorbent media that performs well at a multiple part-per-million concentration of VOCs will remove a much lower percentage of VOCs at lower concentrations, such as at multiple part-per-billion concentrations.

The filter elements and media disclosed herein remove significant levels of VOCs even at low concentrations typically experienced within aircraft cabins. In addition, the filter elements and media disclosed herein also perform well at removing VOCs over a range of molecular weights, such as lower molecular weight VOCs (characterized herein as molecular weights of less than or equal to 60 g/mol) as well as higher molecular weight VOCs (characterized herein as molecular weights of greater than 60 g/mol).

The configuration described herein with activated carbon positioned upstream of a catalyst material provides various benefits to the removal of hydrocarbons from gas streams. These benefits can include, in various implementations, more complete removal of both large and small molecular weight compounds, removal of large molecular weight compounds without significant release of further harmful breakdown products, the ability to remove hydrocarbons successfully at very low molecular weights, removal of hydrocarbons even at very high gas flow rates, and avoidance of overloading (also known as poisoning) of the catalyst.

In an embodiment, the filtration element is configured to remove VOCs from an airstream. The first media portion can be configured to adsorb high molecular weight molecules. The second media portion can be configured to break down low molecular weight molecules, such as into water and carbon dioxide.

In an example embodiment the first media portion is configured to remove hydrocarbons having a molecular weight of at least 60 g/mol, and the second media portion is configured to remove hydrocarbons having a molecular weight of less than 60 g/mol. In some embodiments the first media portion is configured to remove hydrocarbons having a molecular weight of at least 60 g/mol, and the second media portion is configured to degrade hydrocarbons having a molecular weight of less than 40 g/mol. In certain embodiments the first media portion is configured to remove hydrocarbons having a molecular weight of at least 80 g/mol.

In an embodiment the first media portion is configured to remove at least 50 percent of hydrocarbons having a molecular weight of at least 60 g/mol, and the second media portion is configured to remove at least 50 percent of hydrocarbons having a molecular weight of less than 60 g/mol, at concentrations of less than 1.0 parts per million of total hydrocarbons.

In an embodiment the first media portion is configured to maintain at least 50 percent efficiency for removal from an air stream of hydrocarbons having a molecular weight of at least 60 g/mol at concentration levels of less than 0.5 parts per million for at least 3000 hours, and the second media portion is configured to maintain at least 40 percent efficiency for removal of hydrocarbons having a molecular weight of less than 60 g/mol, at concentrations levels of less than 0.5 parts per million for at least 3000 hours.

In some implementations, in combination, the first media portion and second media portion are configured to maintain at least 50 percent efficiency for removal of all hydrocarbons at concentration levels of less than 0.5 parts per million for at least 3000 hours. In certain embodiments the hydrocarbon removal can occur at a face velocity through the filter element of 12 feet per minute or greater. In certain implementations the hydrocarbon removal occurs without apparent change of temperature of the air stream.

In an embodiment the first media portion is configured to maintain at least 50 percent efficiency for removal from an air stream of hydrocarbons having a molecular weight of at least 60 g/mol at concentration levels of less than 1.0 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 2000 hours. In some implementations, in combination, the first media portion and second media portion are configured to maintain at least 50 percent efficiency for removal of all hydrocarbons at concentration levels of less than 1.0 parts per million for at least 2000 hours. In certain embodiments the hydrocarbon removal can occur at a face velocity through the filter element of 12 feet per minute or greater. In certain implementations the hydrocarbon removal occurs without apparent change of temperature of the air stream.

In an embodiment the first media portion is configured to maintain at least 50 percent efficiency for removal from an air stream of hydrocarbons having a molecular weight of at least 60 g/mol at concentration levels of less than 1.0 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 3000 hours.

In some implementations, in combination, the first media portion and second media portion are configured to maintain at least 50 percent efficiency for removal of all hydrocarbons at concentration levels of less than 1.0 parts per million for at least 3000 hours. In certain embodiments the hydrocarbon removal can occur at a face velocity through the filter element of 10 feet per minute, 25 feet per minute, 50 feet per minute, or greater. In certain implementations the hydrocarbon removal occurs without apparent change of temperature of the air stream.

In an embodiment the first media portion is configured to maintain at least 50 percent efficiency for removal from an air stream of hydrocarbons having a molecular weight of at least 60 g/mol at concentration levels of less than 1.0 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 3000 hours. In some implementations, in combination, the first media portion and second media portion are configured to maintain at least 75 percent efficiency for removal of all hydrocarbons at concentration levels of less than 1.0 parts per million for at least 3000 hours. In certain embodiments the hydrocarbon removal can occur at a face velocity through the filter element of 12 feet per minute or greater. In certain implementations the hydrocarbon removal occurs without apparent change of temperature of the air stream.

In an embodiment the first media portion is configured to maintain at least 50 percent efficiency for removal from an air stream of hydrocarbons having a molecular weight of at least 60 g/mol at concentration levels of less than 1.0 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 2000 hours. In some implementations, in combination, the first media portion and second media portion are configured to maintain at least 90 percent efficiency for removal of all hydrocarbons at concentration levels of less than 1.0 parts per million for at least 2000 hours. In certain embodiments the hydrocarbon removal can occur at a face velocity through the filter element of 12 feet per minute or greater. In certain implementations the hydrocarbon removal occurs without apparent change of temperature of the air stream.

In an embodiment the first media portion is configured to maintain at least 50 percent efficiency for removal from an air stream of hydrocarbons having a molecular weight of at least 60 g/mol at concentration levels of less than 1.0 parts per million for at least 3000 hours, and the second media portion is configured to maintain at least 40 percent efficiency for removal of hydrocarbons having a molecular weight of less than 60 g/mol, at concentrations levels of less than 1.0 parts per million for at least 2000 hours. In some implementations, in combination, the first media portion and second media portion are configured to maintain at least 95 percent efficiency for removal of all hydrocarbons at concentration levels of less than 1.0 parts per million for at least 2000 hours. In certain embodiments the hydrocarbon removal can occur at a face velocity through the filter element of 12 feet per minute or greater. In certain implementations the hydrocarbon removal occurs without apparent change of temperature of the air stream Generally the filter element does not significantly increase the temperature of air passing through it. Often there is no noticeable change in temperature, and typically the temperature differential of the input and output air is less than 1° C. across the filtration element during operation within an aircraft cabin. More typically the differential is less than 2° C., and more typically less than 5° C. across the filtration element during operation within an aircraft cabin.

In various implementations the filter element includes pleated or z-flow media that has a relatively low weight compared to packed bed carbon constructions, and in particular a low mass per surface area of media. In some embodiments the first media portion of the filter element has a mass to media surface area ratio of greater than 400 g/m$^2$ grams per square meter, and the second media portion of the filter element has a mass to media surface area ratio of greater than 1500 g/m².

The media forming the first and second media portions can be various folded and non-folded constructions, including pleated and corrugated constructions, as well as beaded constructions in some embodiments. Optionally the first media portion comprises pleated filter media, the second media portion comprises pleated filter media, or both the first and second media portions comprise pleated filter media. The first, second, or both filtration medias can be formed of corrugated media, with or without facing sheets, and with or without plugs at either end of the corrugated media. The activated carbon of the first media portion comprises activated carbon beads in some embodiments. Such carbon beads are selected to preserve low weight and high air flow rates without excessive flow reduction.

Various catalysts may be used in the second media portion, including low temperature catalysts that perform well at or near room temperatures. Suitable catalyst materials include catalysts formed with manganese dioxide, copper oxide, and combinations thereof. Various base metals and metal oxides can be used, such as manganese, iron, cobalt, nickel, copper and the oxides of these metals. Other suitable catalysts include potassium permanganate and other base metal oxides. Suitable catalysts include, for example, Carulite® catalyst, manufactured by the Cams Corporation. Suitable catalysts include precious metals, transition metals, base metals and combinations thereof; inorganic and organic oxides, and salts.

In addition to being used within an aircraft cabin, filter elements made in accordance with the disclosures herein can be used in other environments, such as within homes, businesses, other buildings, and other vehicles.

Various additional filter materials can be included in addition to the first and second media portions, such as a pre-filter located upstream from the first media portion. The pre-filter can include, for example, cellulosic or synthetic fibers. The pre-filter can be configured to remove particulate contaminants. The filter element can also include a post-filter, such as a post-filter located downstream from the second media portion. The post-filter optionally includes cellulosic or synthetic fibers, and can be configured to remove particulate contaminants.

Now, in references to the drawings, FIG. 1 is a schematic view of a filtration element 100, according to an embodiment. The filtration element 100 can include a first media portion 110 and a second media portion 120. The first media portion 110 is upstream of the second media portion 120, such that air flows through the first media portion 110 prior to flowing through the second media portion 120. The airflow can travel in the direction of the arrow 130, such that the airflow enters the filtration element 100 at the face 102, and the airflow exits the filtration element 100 at face 104. In an embodiment, the face 102 can be subjected to an airflow that results in a face velocity on face 102 of not more than 15 fpm. In an embodiment, the pressure drop of the airflow across the filtration element 100 is less than 0.5 inches water column, commonly less than 1.0 inches water column, optionally less than 2.0 inches of water column. In some embodiments the pressure drop is less than 0.75 inches, less than 0.5 inches, or less than 0.25 inches.

In various embodiments, the filtration element 100 can be disposed in a housing. The housing can include metal or a polymer, for example. The housing can provide support and direct the airflow through the filtration element.

The filtration element 100 can be configured to remove VOCs from an airstream. In an embodiment, the first media portion 110 can be configured to adsorb or remove high molecular weight molecules from an airstream, such as limonene and toluene. The second media portion 120 can be configured to break down low molecular weight molecules from an airstream, such as alcohol and formaldehyde, including reaction products from the first media portion 110. In an embodiment, the second media portion 120 breaks down low molecular weight molecules into water and carbon dioxide.

The filtration element 100 can be configured for use in low temperatures. The filtration element 100 can be configured for use with an airflow that is room temperature, such as airflow with an entering temperature of at least 60° F. and not more than 120° F. Further, the airflow through the filtration element 100 can have a substantially similar temperature, such that the temperature difference from the incoming air to the outgoing air is less than 1° C. In alternative embodiments, the airflow can have a temperature difference across the filtration element 100 of less than 0.5° C., 2° C., or 5° C. In an embodiment, the filtration element 100 degrades at least 50% of low molecular weight molecules between the temperatures of 60° F. and not more than 120° F.

Figure 2:
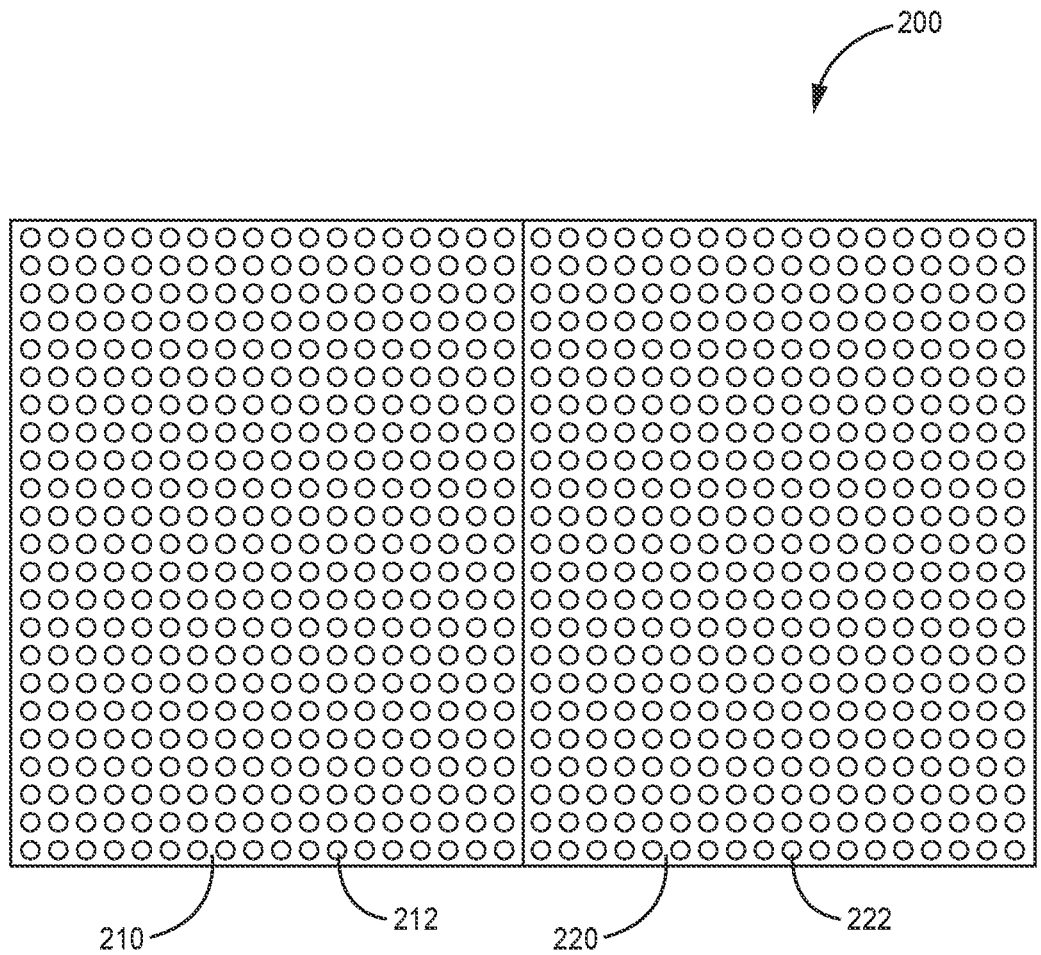
FIG. 2 is a simplified view of a cross-section of a filtration element, according to an embodiment.
Figure 3:
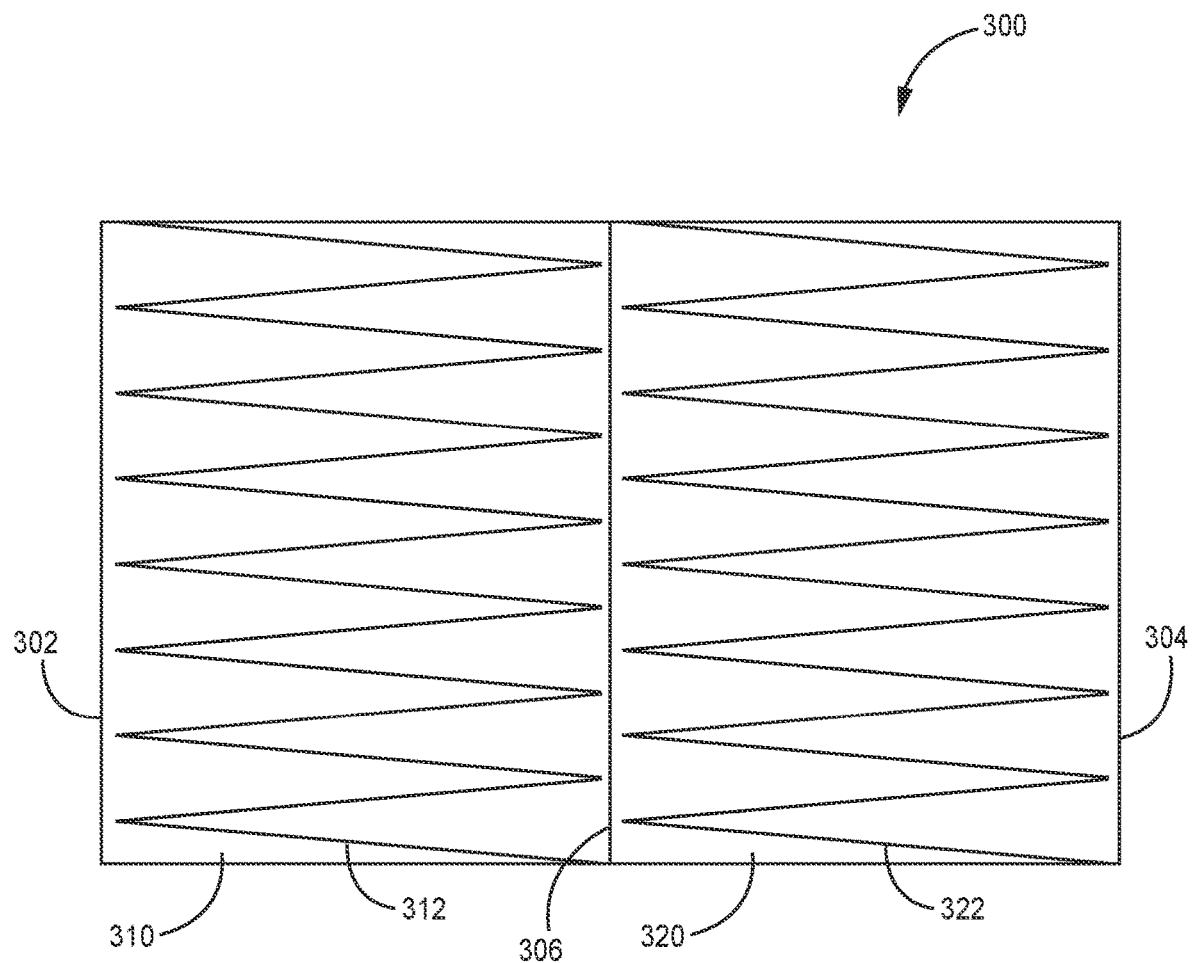
FIG. 3 is a simplified view of a cross-section of a filtration element, according to an embodiment.
Figure 4:
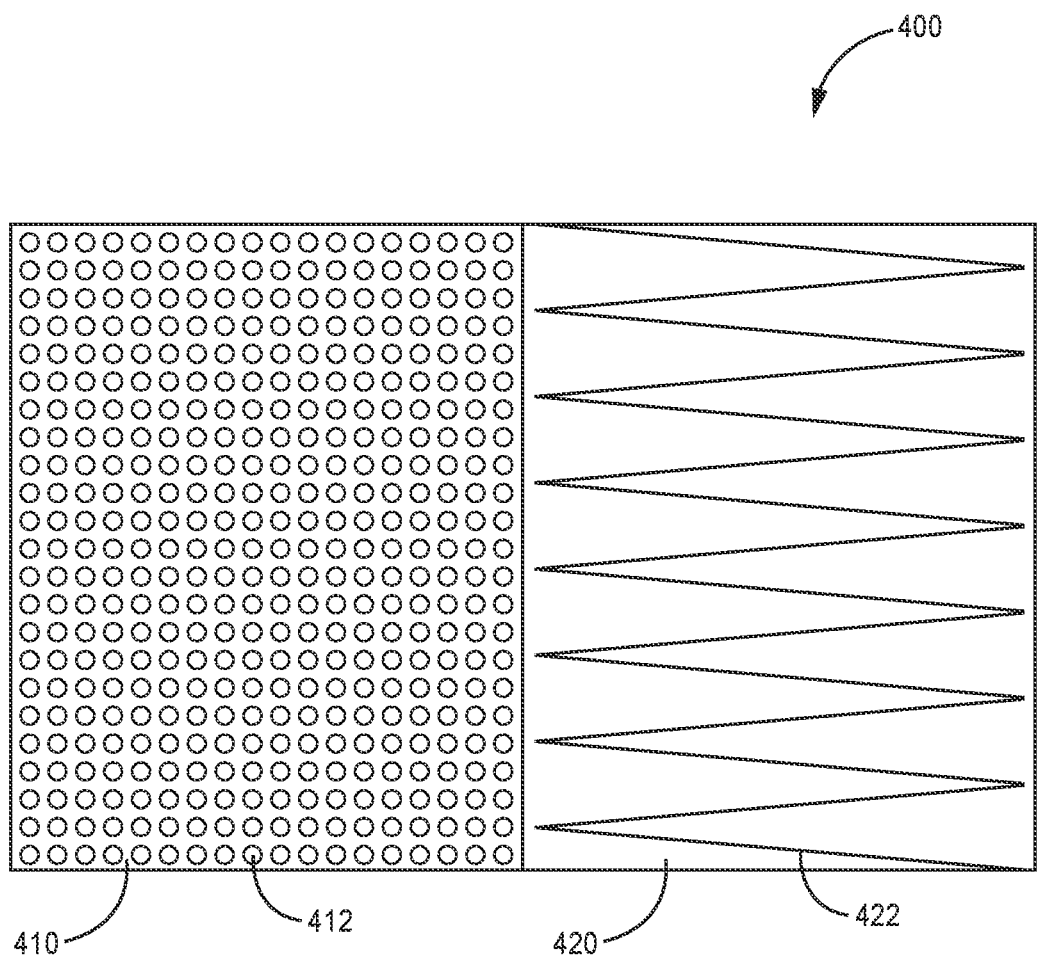
FIG. 4 is a simplified view of a cross-section of a filtration element, according to an embodiment.
Figure 5:
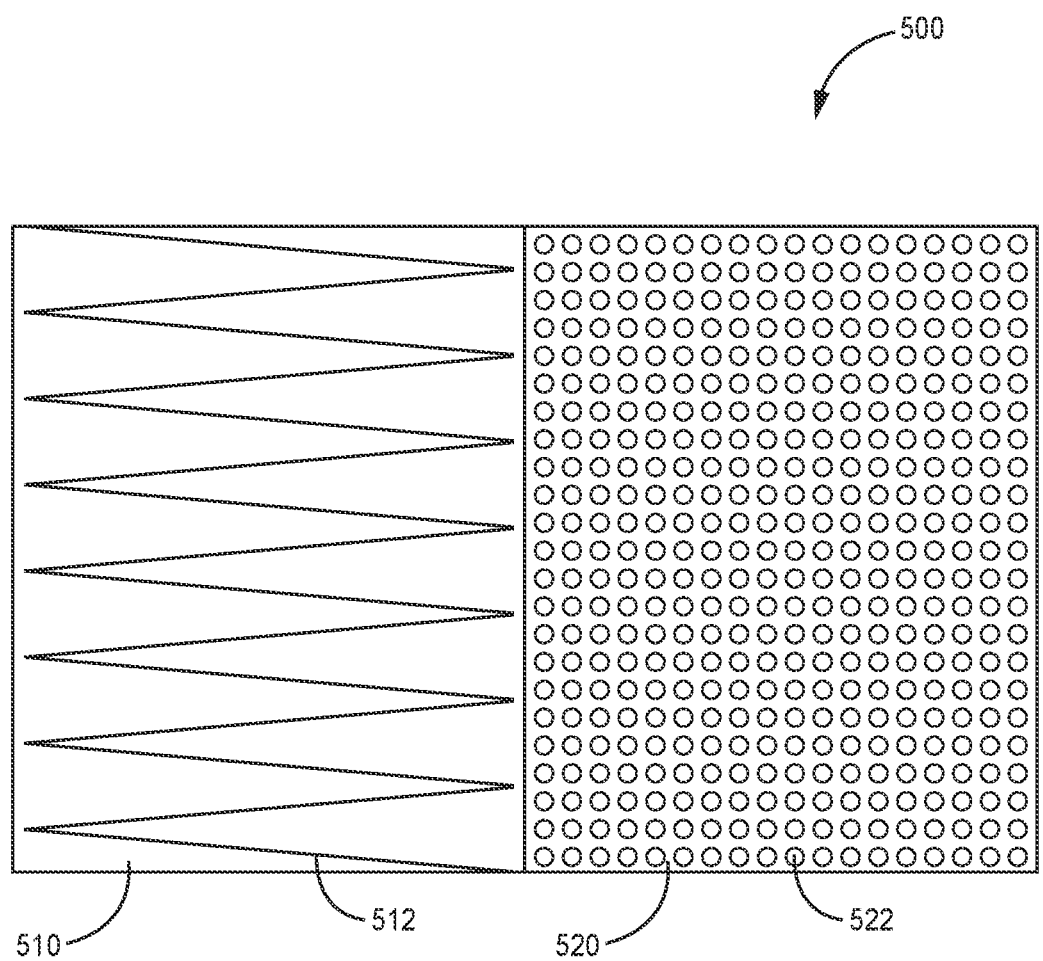
FIG. 5 is a simplified view of a cross-section of a filtration element, according to an embodiment.

In an embodiment, the first media portion 110 can include carbon, such as activated carbon. The activated carbon can be incorporated into a folded or pleated filter media, such as shown in FIGS. 3 and 5. The activated carbon can include carbon beads, such as shown in FIGS. 2 and 4.

In an embodiment, the second media portion 120 can include a catalyst material. The catalyst material can include, for example, manganese dioxide, copper oxide, and mixtures thereof. In an embodiment, the second media portion 120 includes Carulite® 200 produced by the Cams Corporation in Peru, Ill. The catalyst material can be incorporated into a folded or pleated filter media, such as shown in FIGS. 3 and 4. The catalyst material can also be in a bead or granular form, such as shown in FIGS. 2 and 5. The catalyst media can include two layers of high permeability media supporting a layer of catalyst material. More specifically, one surface of a layer of air filter media having high permeability can be (for example) coated with 3M™ Hi-Strength 90 spray adhesive. A single layer of manganese dioxide/copper oxide catalyst granules can be spread onto the media/adhesive with substantially even distribution across the surface. A layer of the 3M™ Hi-Strength 90 spray adhesive (for example) can then be applied to the layer of catalyst granules and a final layer of high permeability air filter media can be used to encapsulate the catalyst granules.

In an embodiment the media has a permeability of 100 to 300 cubic feet per minute, commonly 150 to 250 cubic feet per minute, in some cases about 200 cubic feet per minute. Generally the permeability is more than 50 cubic feet per minute, more than 100 cubic feet per minute, more than 150 cubic feet per minute, more than 200 cubic feet per minute, and more than 250 cubic feet per minute.

In an embodiment, the filtration element 100 is no more than 4 in. deep. In an embodiment, the first media portion 110, when independently pleated, can be at least 1 in. deep, such as the distance from face 102 to end of the first media portion at face 106. In an embodiment, the first media portion 110 is no more than 2 inches deep. In an embodiment, the second media portion 120 can be at least 1 inches deep, such as the distance from face 106 to face 104. In an embodiment, the second media portion 120 is no more than 2 inches deep.

FIG. 2 shows a view of a cross-section of a filtration element 200, according to an embodiment. The filtration element 200 can include a first media portion 210 and a second media portion 220. The first media portion 210 can include activated carbon beads 212. The second media portion 220 can include a granular catalyst 222. Generally the activated carbon beads 212 and granular catalyst 222 are selected so as to be light weight and arranged so as to provide a low pressure drop across the filtration element.

FIG. 3 shows a view of a cross-section of a filtration element 300, according to an embodiment. The filtration element 300 can include a first media portion 310 and a second media portion 320. The first media portion 310 can include a pleated or folded filtration media or scrim 312. The pleated or folded filtration media or scrim 312 can include activated carbon, such as activated carbon that is impregnated into the filtration media or scrim 312. The second media portion 320 can include a pleated or folded filtration media or scrim 322. The second media portion 320 can include a catalyst material, such as a catalyst material that is impregnated into the filtration media or scrim 322.

In an embodiment, the filtration media 312, 322 can have a pleat density of at least 2 pleats/inch. The filtration media 312 can substantially extend from face 302 to face 306, such as the depth of the first media portion 310. In an embodiment, the filtration media 312 extends at least 90% of the distance from face 302 to face 306. In an embodiment, the filtration media 312 extends at least 85%, 75% or 50% of the distance from face 302 to face 306.

The filtration media 322 can substantially extend from face 306 to face 304, such as the depth of the second media portion 320. In an embodiment, the filtration media 322 extends at least 90% of the distance from face 306 to face 304. In an embodiment, the filtration media 322 extends at least 85%, 75% or 50% of the distance from face 306 to face 304.

FIG. 4 is a view of a cross-section of a filtration element 400, according to an embodiment. The filtration element 400 includes a first media portion 410 and a second media portion 420. In an embodiment, the first media portion 410 includes activated carbon beads 412 and the second media portion 420 includes a catalyst impregnated into a pleated or folded filter media 422.

FIG. 5 is a view of a cross-section of a filtration element 500, according to an embodiment. The filtration element 500 includes a first media portion 510 and a second media portion 520. In an embodiment, the first media portion 510 includes a pleated or folded filter media 512 that is impregnated with activated carbon and the second media portion 520 includes beads of a catalyst or a granular catalyst 522, such as beads coated with a catalyst.

Figure 6:
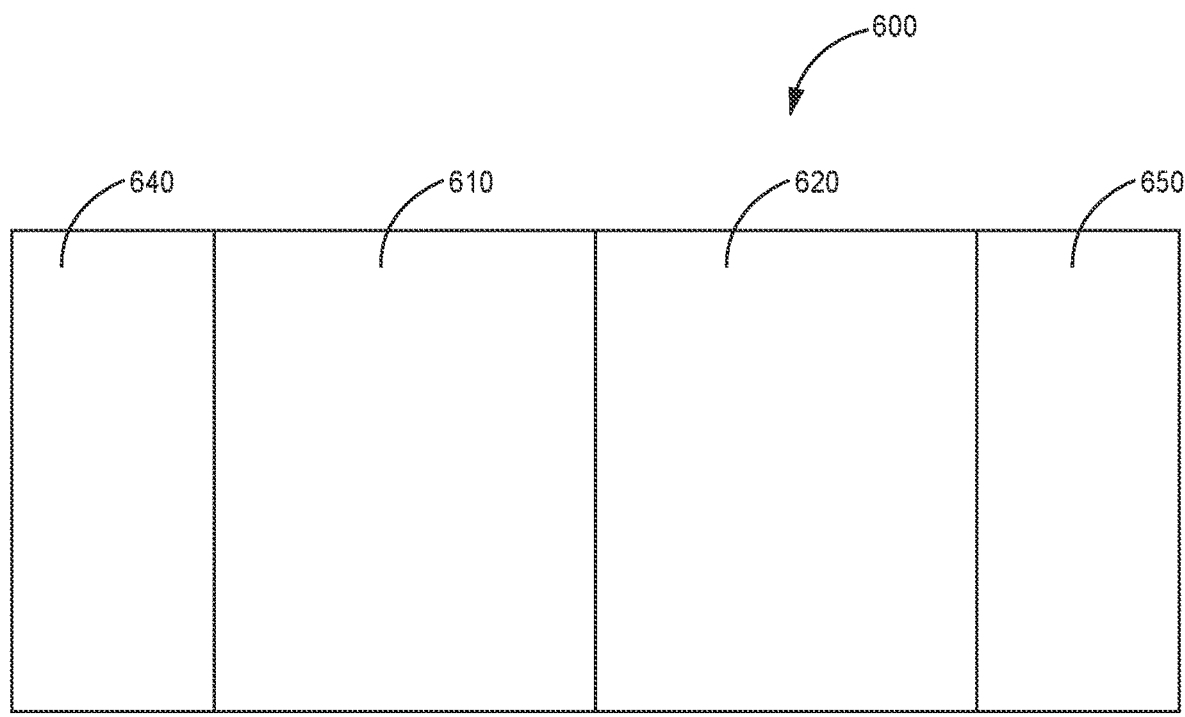
FIG. 6 is a simplified view of a filtration element, according to an embodiment.

FIG. 6 is a view of a filtration element 600, according to an embodiment. The filtration element 600 includes a first media portion 610 and a second media portion 620. In an embodiment, the filtration element 600 includes a pre-filter 640 and a post-filter 650. The pre-filter 640 is located upstream of the first media portion 610. The post-filter 650 can be located downstream of the second media portion 620.

Figure 7:
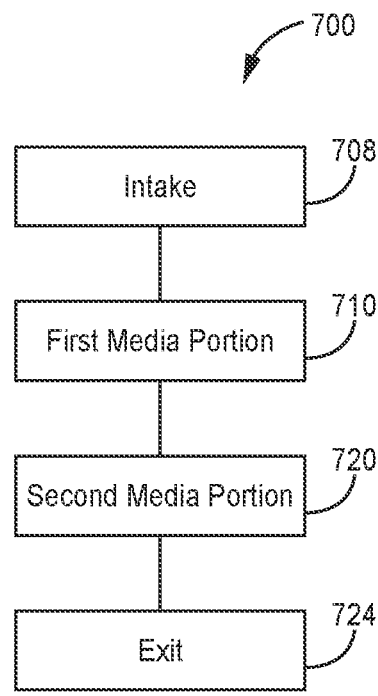
FIG. 7 is a schematic of a filtration element, according to an embodiment.

FIG. 7 is a schematic of a filtration element 700, according to an embodiment. The filtration element 700 can include an intake 708, such as where an airflow enters the filtration element 700. The intake 708 can include a pre-filter. The intake 708 can direct the airflow to the first media portion 710. The intake 708 can include air ducts, piping or tubing configured for an airstream to pass through.

The filtration element 700 can include a first media portion 710 and a second media portion 720. The first media portion 710 can include activated carbon, such as carbon beads or a folded media impregnated with carbon. The second media portion 720 can include a catalyst material, such as a granular catalyst or a folded media impregnated with a catalyst.

In various embodiments, the first media portion 710 is adjacent to the second media portion 720, such as shown in FIGS. 1-7. The first media portion 710 and the second media portion 720 can be adjacent, such that they are next two each other or touching each other. In an alternative embodiment, there can be a gap or space between the first media portion 710 and the second media portion 720, such that the airflow must travel through the gap after it leaves the first media portion 710 and before it enters the second media portion 720. In an embodiment, the gap can be at least 1 centimeter. In an embodiment, the gap can be no longer than 5 centimeters.

The filtration element 700 can include an exit 724, such as where the airstream leaves or exits the filtration element 700. The exit 724 can include air ducts, piping, or tubing configured for an airstream to pass through. The exit 724 can be configured to direct the airflow in a desired direction, such as into the cabin of an airplane.

Figure 8:
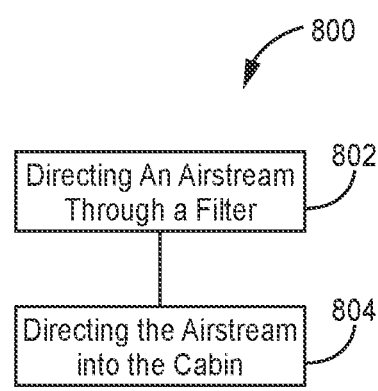
FIG. 8 is a flow chart of a method for filtering an airstream, according to an embodiment.

FIG. 8 shows a flow chart of a method 800 for filtering an airstream, according to an embodiment. The method 800 includes directing an airstream through a filtration element, step 802. The filtration element includes a first media portion and a second media portion. The first media portion is upstream of the second media portion. The first media portion can include activated carbon. The second media portion can include a catalyst material. In step 804, the method can include directing a filtered airstream from the filtration element into a cabin of an airplane. The method 800 can further include directing the airstream through a pre-filter, such as prior to being directed through the first media portion. The method 800 can also include directing the airstream through a post-filter, such as after exiting the second media portion of the filtration element.

EXPERIMENTAL

Example filter elements were constructed. The sample filter elements were created using pleated carbon and catalyst media, with face areas of 3 inches by three inches, and media depth of 2 inches. The catalyst material was Carulite 200.

The example elements were placed on attest bench to measure their ability to remove low concentration hydrocarbon contamination from air over long durations. The test bench was operated at room temperature, with the air approach velocity of 162 feet per minute and residence time of 0.05 seconds. Target concentrations of contaminants were as follows:

Limonene: 50 ppb-v
Toluene: 30 ppb-v
Ethanol: 300 ppb-v
Acetone: 15 ppb-v
Formaldehyde: 15 ppb-v Tests were performed at 1000 hours for elements having just carbon, just catalyst, and a combination of upstream catalyst and downstream catalyst. Tests were also performed at 2000 hours for elements having just carbon, just catalyst, and a combination of upstream carbon and downstream catalyst. Further tests were performed at 3000 and 4000 hours for elements having just carbon and upstream carbon and downstream catalyst.

TABLE 1

Removal efficiency at 1000 hours:

| Contaminant | Carbon Only | Catalyst Only | Carbon/Catalyst |
|---|---|---|---|
| Limonene | 85% | 60% | 99% |
| Toluene | 65% | 25% | 90% |
| Ethanol | 38% | 28% | 55% |
| Acetone | 32% | 23% | 45% |
| Formaldehyde | 25% | 30% | 52% |

TABLE 2

Removal efficiency at 2000 hours:

| Contaminant | Carbon Only | Catalyst Only | Carbon/Catalyst |
|---|---|---|---|
| Limonene | 77% | 58% | 99% |
| Toluene | 45% | 23% | 82% |
| Ethanol | 23% | 35% | 52% |
| Acetone | 15% | 18% | 40% |
| Formaldehyde | 5% | 24% | 51% |

TABLE 3

Removal efficiency at 3000 hours:

| Contaminant | Carbon Only | Carbon/Catalyst |
|---|---|---|
| Limonene | 75% | 98% |
| Toluene | 40% | 75% |
| Ethanol | 20% | 55% |
| Acetone | 10% | 42% |
| Formaldehyde | 0% | 40% |

TABLE 4

Removal efficiency at 4000 hours:

| Contaminant | Carbon Only | Carbon/Catalyst |
|---|---|---|
| Limonene | 68% | 99% |
| Toluene | 30% | 79% |
| Ethanol | 18% | 53% |
| Acetone | 5% | 45% |
| Formaldehyde | 0% | 44% |

As demonstrated in Table 1 to Table 4, the use of only carbon and only catalyst had significantly worse performance than the combination of carbon followed by a catalyst, and the performance continued stronger than would be expected over a longer period of time. For example, with Limonene, the carbon and catalyst combination was much stronger than observed with only carbon or only catalyst: 99 percent, compared to 85 percent and 60 percent, respectively. The benefit is more than one would assume from just simple series of removal stages. Also, where the carbon only and catalyst only showed significant reductions in performance over time, the carbon and catalyst combination did not show the same levels of performance reductions.

Similarly, for toluene, ethanol, acetone, and formaldehyde the combination of a carbon and catalyst outperformed the carbon alone and catalyst alone, and outperformed them very significantly. While there was some diminishment of efficiency in removal of some of these contaminants over time, that diminishment was much less than observed with the carbon alone and catalyst alone.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The invention has been described with reference to various specific and preferred embodiments and techniques. However, it should be understood that many variations and modifications may be made while remaining within the spirit and scope of the invention.

The invention claimed is:

1. An air filtration filter element, the filter element comprising:
    a first media portion, the first media portion comprising activated carbon; and
    a second media portion downstream from the first media portion, the second media portion comprising two layers of pleated media between which a layer of catalyst granules is distributed, the catalyst granules retained by adhesive to at least one of the layers of the pleated media.

2. The air filtration element of claim 1, wherein the catalyst granules compromise manganese dioxide and copper oxide.

3. The air filtration element of claim 1, wherein the catalyst granules are retained by adhesive to both layers of the pleated media.

4. The air filtration filter element of claim 1, wherein the first media portion has a thickness of 50 to 100 percent of the thickness of the second media portion.

5. The air filtration filter element of claim 1, wherein the second media portion has a thickness of 100 to 150 percent of the thickness of the first media portion.

6. The air filtration filter element of claim 1, wherein the first filter media portion comprises pleated filter media.

7. The air filtration filter element of claim 1, wherein the first media portion is configured to remove or break down at least 50 percent of hydrocarbons having a molecular weight of at least 60 g/mol, and the second media portion is configured to remove or break down at least 50 percent of hydrocarbons having a molecular weight of less than 60 g/mol, at concentrations of less than 1.0 parts per million of total hydrocarbons with an average air residency time in the filter element of less than 5 seconds.

8. The air filtration filter element of claim 1, wherein the first media portion is configured to remove or break down at least 50 percent of hydrocarbons having a molecular weight of at least 50 g/mol, and the second media portion is configured to remove or break down at least 50 percent of hydrocarbons having a molecular weight of less than 60 g/mol, at concentrations of less than 1.0 parts per million of total hydrocarbons at a temperature from of 60° F. to 120° F., at a face velocity though the filter element of at least 15 feet per minute, and an average air flow residency time in the filter element of less than 1 second.

9. The air filtration filter element of claim 1, wherein the first media portion is configured to remove or break down at least 75 percent of hydrocarbons having a molecular weight of at least 50 g/mol, and the second media portion is configured to remove or break down at least 75 percent hydrocarbons having a molecular weight of less than 50 g/mol, at concentrations of less than 1.0 parts per million of total hydrocarbons at a temperature of 30° C., at a face velocity though the filter element of at least 15 feet per minute, and an average air flow residency time in the filter element of less than 1 seconds.

10. The air filtration filter element of claim 1, wherein the first media portion is at least 25% larger than the second media portion by volume.

11. The air filtration filter element of claim 1, wherein the second media portion is at least 25% larger than the first media portion by volume.

12. The air filtration filter element of claim 1, wherein the first media portion and the second media portion are adjacent to each other.

13. An air filtration filter element, the element comprising:
a first media layer comprising activated carbon; and
a second media layer downstream of the first media layer, the second media layer comprising two layers of pleated media between which a layer of catalysts granules comprising manganese dioxide and copper oxide is spread, the catalyst granules retained by adhesive to both layers of the pleated media.

14. The air filtration filter element of claim 13, wherein at a face velocity through the filter element of more than 15 feet per minute, a temperature from 60° F. to 120° F., and a concentration of less than 1.0 parts per million of total hydrocarbons:
(i) the first media layer removes or breaks down at least 50 percent of hydrocarbons having a molecular weight of at least 60 g/mol, and
(ii) the second media layer removes or breaks down at least 50 percent of hydrocarbons having a molecular weight of less than 60 g/mol.

15. The air filtration filter element of claim 13, wherein the second media portion has a permeability of 100 to 300 cubic feet per minute.

16. The air filtration filter element of claim 13, wherein the second media portion has a permeability of greater than 100 cubic feet per minute.

17. The air filtration filter element of claim 13, wherein the air filtration filter element has a pressure differential across the element of less than 0.5 inches of water at a face velocity of 15 feet per minute.

18. The air filtration filter element of claim 13, wherein the first media layer has a thickness of 50 to 150 percent of the thickness of the second media layer.

19. The air filtration filter element of claim 13, wherein the first media layer comprises pleated filter media.

20. A method for filtering an airstream for the cabin of an airplane, comprising:
directing an unfiltered airstream through a filtration element of claim 1 to produce a filtered airstream; and
directing the filtered airstream from the filtration element into a cabin of an airplane.

* * * * *